US008707926B2

(12) United States Patent
Tadokoro et al.

(10) Patent No.: US 8,707,926 B2
(45) Date of Patent: Apr. 29, 2014

(54) CYLINDER HEAD COVER STRUCTURE OF MINIATURIZED VEHICLE

(75) Inventors: Hiroshi Tadokoro, Saitama (JP); Takanori Osuka, Saitama (JP); Seiichi Nishihira, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 558 days.

(21) Appl. No.: 12/887,568

(22) Filed: Sep. 22, 2010

(65) Prior Publication Data

US 2011/0073063 A1 Mar. 31, 2011

(30) Foreign Application Priority Data

Sep. 25, 2009 (JP) ................................ 2009-220671

(51) Int. Cl.
*F02F 1/28* (2006.01)
*F02F 1/36* (2006.01)
*B60K 11/04* (2006.01)

(52) U.S. Cl.
USPC ................ 123/193.5; 123/198 E; 123/195 C; 123/41.82 R; 180/229; 180/68.4

(58) Field of Classification Search
USPC ........... 123/572, 41.1, 41.43, 41.82 R, 198 E, 123/195 C, 193.5; 180/68.1, 68.4, 229
See application file for complete search history.

(56) References Cited

U.S. PATENT DOCUMENTS

| | | | | |
|---|---|---|---|---|
| 4,180,137 | A * | 12/1979 | Wagner | 180/229 |
| 4,461,366 | A * | 7/1984 | Honda | 180/229 |
| 4,501,234 | A * | 2/1985 | Toki et al. | 123/41.86 |
| 5,333,578 | A * | 8/1994 | Shimura et al. | 123/90.17 |
| 6,920,950 | B2 * | 7/2005 | Sonoda | 180/68.3 |

FOREIGN PATENT DOCUMENTS

JP 62-26288 U 2/1987

* cited by examiner

*Primary Examiner* — Lindsay Low
*Assistant Examiner* — Kevin Lathers
(74) *Attorney, Agent, or Firm* — Birch, Stewart, Kolasch & Birch, LLP

(57) ABSTRACT

A cylinder head cover structure of a vehicle which can shorten a longitudinal length of a vehicle while avoiding the restriction on the layout of an engine. A motorcycle includes a vehicle body frame, an engine which is mounted on the vehicle body frame in a suspended manner and includes a cylinder head cover and a radiator which is arranged in front of the engine and behind a front wheel. A recessed portion which is recessed toward a rear side of the vehicle is formed in the cylinder head cover so as to allow a lower portion of the radiator to enter the recessed portion.

13 Claims, 10 Drawing Sheets

CYLINDER HEAD COVER STRUCTURE OF MINIATURIZED VEHICLE

CROSS-REFERENCE TO RELATED APPLICATIONS

The present application claims priority under 35 USC 119 to Japanese Patent Application No. 2009-220671 filed on Sep. 25, 2009 the entire contents of which are hereby incorporated by reference.

BACKGROUND OF THE INVENTION

1. Field of the Invention

The present invention relates to the cylinder head cover structure of a miniaturized vehicle.

2. Description of Background Art

Conventionally, a motorcycle is provided with a radiator in front of an engine in the longitudinal direction of the vehicle. See, for example, JP-UM-A-62-26288 (FIG. 2). In JP-UM-A-62-26288, the radiator is mounted on a down frame behind a front wheel and in front of a cylinder head cover of the engine.

In the motorcycle disclosed in JP-UM-A-62-26288, there may be a case where a longitudinal length of the vehicle is shortened while ensuring a space for arranging the radiator between the down frame and the engine. In this case, however, the restriction such as lowering of an engine mounting position is imposed on the layout of the engine.

SUMMARY AND OBJECTS OF THE INVENTION

The present invention has been made under such circumstances, and it is an object of an embodiment of the present invention to provide the cylinder head cover structure of a miniaturized vehicle which can shorten a longitudinal length of a vehicle while avoiding the restriction on the layout of an engine.

To achieve the above-mentioned object, according to an embodiment of the present invention a cylinder head cover structure of a miniaturized vehicle includes: a vehicle frame; an engine which is mounted on the vehicle frame in a suspended manner and includes a cylinder head cover; and a radiator which is arranged in front of the engine and behind a front wheel, wherein a recessed portion which is recessed toward a rear side of the vehicle is formed in the cylinder head cover so as to allow a portion of the radiator to enter the recessed portion.

According to an embodiment of the present invention, the inside of the cylinder head cover forms a breather chamber around the recessed portion.

According to an embodiment of the present invention, the cylinder head cover structure further includes a breather hose which connects a breather chamber which is formed in the inside of the cylinder head cover and an air cleaner which is arranged behind and above the radiator, the cylinder head cover includes an upper projecting portion which is positioned at an upper side, and a lower projecting portion which is positioned at a lower side in a state where the engine is mounted on the vehicle body frame in a suspended manner, and the breather hose is connected to an upper projecting portion side of the cylinder head cover.

According to an embodiment of the present invention, the lower projecting portion is divided into first and second lower projecting portions in the vehicle width direction, and a mounting portion on which the radiator is mounted is provided between the first and second lower projecting portions.

According to an embodiment of the present invention, a radiator fan which guides air to the radiator is mounted on a rear portion of the radiator, and another recessed portion which a portion of the radiator fan enters is formed in the cylinder head cover continuously with the recessed portion which the portion of the radiator enters.

According to an embodiment of the present invention, the cylinder head cover structure further includes a breather hose which connects a breather chamber which is formed in the inside of the cylinder head cover and an air cleaner which is arranged behind and above the radiator, and the radiator fan is mounted on a lower portion of the radiator on a side opposite to a connecting portion of the cylinder head cover to which the breather hose is connected in the vehicle width direction.

According to an embodiment of the present invention, the cylinder head cover includes an upper projecting portion which is positioned at an upper side and a lower projecting portion which is positioned at a lower side in a state where the engine is mounted on the vehicle body frame in a suspended manner, and at least one of the radiator fan and a mounting member which mounts the radiator fan on the lower portion of the radiator partially overlaps with the upper projecting portion as viewed in a side view of the vehicle, and is arranged in front of a rear end of the upper projecting portion.

According to an embodiment of the present invention, an indentation portion which constitutes a run-out recess for a mounting member for mounting the radiator fan on a lower portion of the radiator is formed on the recessed portion of the cylinder head cover.

According to an embodiment of the present invention, the vehicle body frame includes a head pipe, and a main frame and a down frame which respectively obliquely extend toward a rear side of the vehicle in a vertically spaced-apart manner from the head pipe, and the down frame is gently bent in the vicinity of the cylinder head cover as viewed in a side view of the vehicle so that the down frame is constituted of an upper down frame which is arranged above an area in the vicinity of the cylinder head cover and a lower down frame which is arranged below the area in the vicinity of the cylinder head cover, and the radiator is positioned behind and below a front end of the upper down frame, and a side surface of the radiator in the vehicle width direction is arranged approximately parallel to the lower down frame.

According to an embodiment of the present invention, a cross member which connects left and right down frames is provided above and behind the radiator, and the radiator is mounted on the down frames in the vicinity of an area above the cross member.

According to an embodiment of the present invention, the recessed portion which is recessed toward the rear side of the vehicle is formed in the cylinder head cover so as to allow the portion of the radiator to enter the recessed portion. Accordingly, the portion of the radiator enters the recessed portion. Thus, it is possible to prevent the radiator from coming into contact with the front wheel and the cylinder head cover whereby the radiator can be arranged in a compact manner while avoiding the restriction imposed on the layout of the engine thus realizing the shortening of a longitudinal length of the vehicle.

According to an embodiment of the present invention, the inside of the cylinder head cover forms the breather chamber around the recessed portion.

Thus, even when the cylinder head cover becomes large, it is possible to efficiently form the breather chamber without elongating the longitudinal length of the vehicle.

According to an embodiment of the present invention, the cylinder head cover includes the upper projecting portion which is positioned at the upper side, and the lower projecting portion which is positioned at the lower side in a state where the engine is mounted on the vehicle body frame in a suspended manner, and the breather hose is connected to the upper projecting portion side of the cylinder head cover. Accordingly, compared to a case where the breather hose is connected to a lower projecting portion side of the cylinder head cover, it is possible to easily prevent the breather hose from coming into contact with the radiator. Thus, the breather hose can be shortened.

According to an embodiment of the present invention, the mounting portion on which the radiator is mounted is provided between the first and second lower projecting portions which are formed by dividing the lower projecting portion in the vehicle width direction. Accordingly, the radiator can be stably mounted without making the cylinder head cover large. Thus, it is possible to ensure that the breather chamber have a fixed capacity in the inside of the first and second lower projecting portions.

According to an embodiment of the present invention, another recessed portion which the portion of the radiator fan enters is formed in the cylinder head cover continuously with the recessed portion which the portion of the radiator enters. Accordingly, the portion of the radiator fan enters another recessed portion. Thus, the radiator fan can be arranged in a compact manner without elongating the longitudinal length of the vehicle.

According to an embodiment of the present invention, the radiator fan is mounted on the lower portion of the radiator on a side opposite to the connecting portion of the cylinder head cover to which the breather hose is connected in the vehicle width direction. Accordingly, the portion on which the radiator fan and the lower portion of the radiator are mounted and the connecting portion where the breather hose is connected can be arranged in a limited space without elongating the cylinder head cover in the longitudinal direction of the vehicle.

According to an embodiment of the present invention, at least one of the radiator fan and the mounting member which mounts the radiator fan on the lower portion of the radiator partially overlaps with the upper projecting portion as viewed in a side view of the vehicle, and is arranged in front of the rear end of the upper projecting portion. Accordingly, it is possible to arrange the radiator and the radiator fan closer to the cylinder head cover in the longitudinal direction of the vehicle. Thus, a mass of frontal parts of the engine can be concentrated and, at the same time, the longitudinal length of the vehicle can be shortened.

According to an embodiment of the present invention, the indentation portion which constitutes the run-out recess for the mounting member for mounting the radiator fan on the lower portion of the radiator is formed on the recessed portion of the cylinder head cover. Accordingly, the mounting of the radiator fan is not restricted by the mounting member. Thus, it is possible to mount the radiator and the radiator fan such that the radiator and the radiator fan are arranged much closer to the cylinder head cover.

According to an embodiment of the present invention, the radiator is positioned behind and below the front end of the upper down frame, and the side surface of the radiator in the vehicle width direction is arranged approximately parallel to the lower down frame. Accordingly, it is possible to arrange the radiator by effectively making use of the space in the vicinity of the down frame while preventing the radiator from coming into contact with the down frame.

According to an embodiment of the present invention, the radiator is mounted on the down frames in the vicinity of the area above the cross member which connects left and right down frames and hence, it is possible to mount the radiator in the vicinity of the cross member having high rigidity of the down frame thus realizing the more stable mounting of the radiator.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
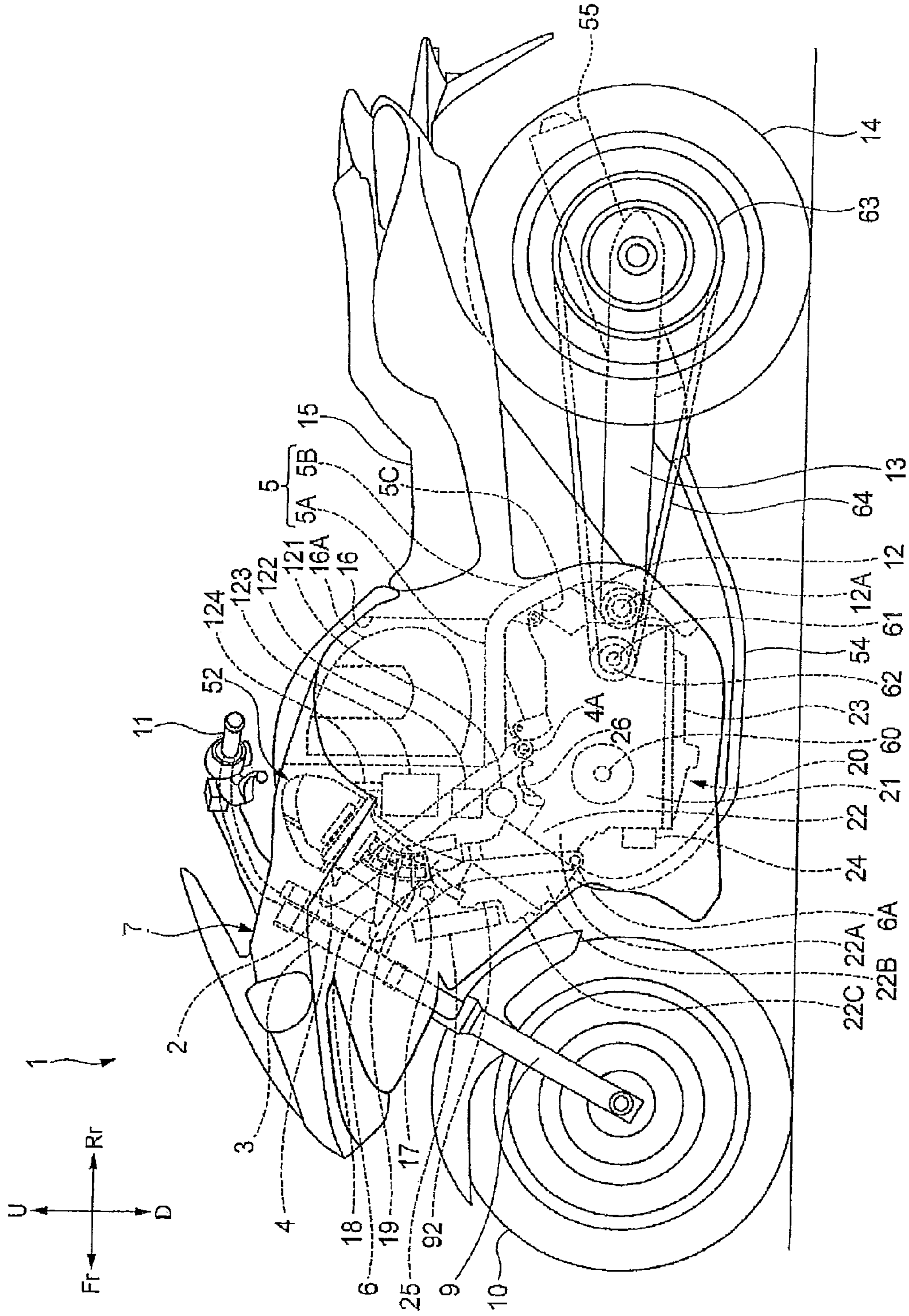
FIG. 1 is a left side view of a motorcycle to which the cylinder head cover structure of a miniaturized vehicle according to the present invention is applied.

Hereinafter, one embodiment of the present invention is explained in conjunction with drawings.

Here, in the explanation made hereinafter, the directions of "frontward," "rearward," "leftward," "rightward," "upward" and "downward" are, unless otherwise specified, determined in accordance with the directions as viewed from a rider. Further, in the drawings, an arrow Fr indicates a front side of a vehicle, an arrow Rr indicates a right side of the vehicle, and an arrow U indicates an upper side of the vehicle.

Figure 2:
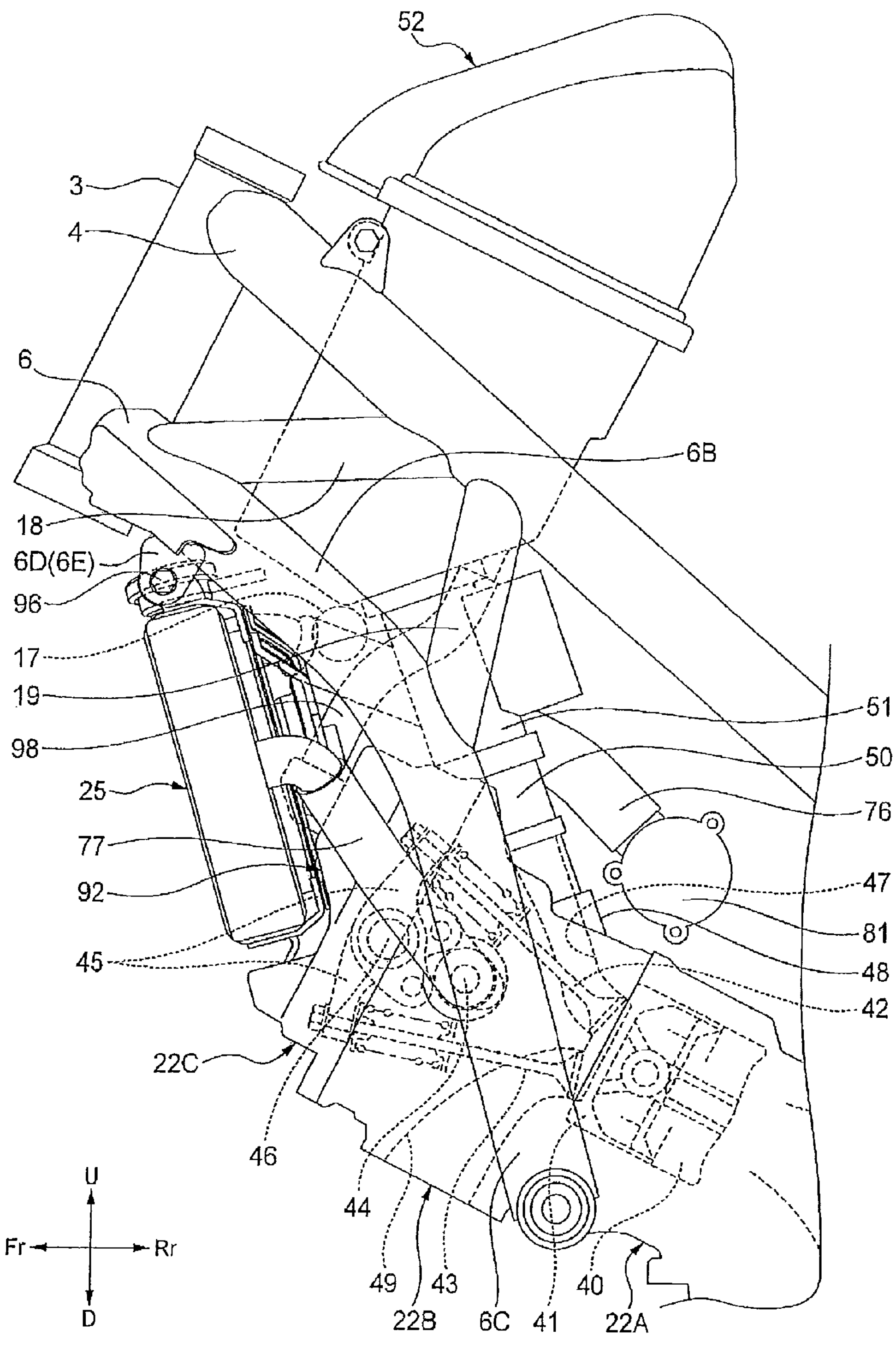
FIG. 2 is a left side view showing a front portion of a vehicle in an enlarged manner.

FIG. 1 is a left side view of a motorcycle to which the cylinder head cover structure of a miniaturized vehicle according to the present invention is applied, and FIG. 2 is a left side view showing a front portion of the vehicle in an enlarged manner.

As shown in FIG. 1, a motorcycle 1 includes a vehicle body frame 2, and the vehicle body frame 2 is covered with a synthetic-resin-made vehicle body cover 7.

The vehicle body frame 2 includes a head pipe 3 which is mounted on a front end of the vehicle body frame 2, a pair of left and right main frames 4 which extend obliquely in the rearward and downward direction from left and right portions of an upper portion of the head pipe 3, a pair of left and right center frames 5 which extend rearward in the horizontal direction from rear ends of the main frames 4 and, thereafter, extend downward while being bent in a rearwardly convex shape, and a pair of left and right down frames 6 which extend obliquely in the rearward and downward direction from left and right portions of a lower portion of the head pipe 3. Further, although not shown in the drawing, the vehicle body frame 2 further includes a pair of left and right seat stays and a pair of left and right middle frames, wherein the pair of left and right seat stays and the pair of left and right middle frames extend rearward from rear upper portions and rear end portions of the center frames 5 respectively, and rear portions of the seat stays and rear portions of the middle frames are connected with each other.

A pair of left and right front forks 9 are supported on the head pipe 3 in a laterally steerable manner. These front forks 9 extend downward and a front wheel 10 is pivotally supported on lower ends of the front forks 9. A steering handle 11 is connected to upper portions of the front forks 9. A pivot plate 12 is mounted on the center frames 5, and a front end of a rear fork 13 is rotatably supported on the pivot plate 12 by way of a pivot bolt 12A. A rear wheel 14 is pivotally supported on a rear end of the rear fork 13, and the rear fork 13 is supported in a vertically swingable manner by way of a rear cushion not shown in the drawing.

A passenger seat 15 which is an integral body formed of a rider seat and a pillion seat is provided above the pair of left and right seat stays, and a storage box 16 is arranged in front of the passenger seat 15 and above the pair of left and right main frames 4, 4. The storage box 16 is formed as a storage box having a large capacity which can store a helmet 16A therein. Here, although not shown in the drawing, a fuel tank is arranged between rear portions (between the seat stays and the middle frames) of the vehicle body frame 2.

As shown also in FIG. 2, a cross member 17 is provided between front portions of the pair of left and right down frames 6. The down frames 6 are gently bent in the vicinity of a cylinder head cover 22C of an engine 20 described later as viewed in a side view of the vehicle. Thus, the down frames 6 are constituted of upper down frames 6B which are positioned above an area in the vicinity of the cylinder head cover 22C and lower down frames 6C which are positioned below the area in the vicinity of the cylinder head cover 22C. The cross member 17 is arranged so as to connect the left and right upper down frames 6B to each other. Further, between the down frames 6 and the main frames 4 which are arranged in a vertically spaced-apart manner, pipe-shaped reinforcing frames 18, 19 are arranged which connect the down frames 6 and the main frames 4 to each other. These reinforcing frames 18, 19 are constituted of the pair of left and right first reinforcing frames 18 which extend rearward from front end portions of the down frames 6 respectively so as to connect the down frames 6 and the main frames 4 to each other, and the pair of left and right second reinforcing frames 19 which extend downward from the main frames 4 in the vicinity of rear ends of the first reinforcing frames 18 so as to connect the down frames 6 and the main frames 4 to each other. Due to such a constitution, a front portion of the vehicle body frame 2 is formed into a truss-shaped frame thus enhancing the rigidity of the front portion of the vehicle body frame 2.

The engine (also referred to as "power unit") 20 which is an internal combustion engine is supported on the main frames 4, lower portions of horizontal portions 5A of the center frames 5 and front portions of downwardly extending portions 5B of the center frames 5. The engine 20 is a parallel-two-cylinder 4-cycle engine having cylinder portion 22 which is inclined in the upward and frontward direction from a front upper portion of a crankcase 21. The front upper portion of the crankcase 21 is supported on rear end portions 4A of the pair of left and right main frames 4, a rear upper portion of the crankcase 21 is supported by a pair of left and right engine hangers 5C which are mounted between the horizontal portions 5A and the downwardly extending portions 5B of the center frames 5, and the cylinder portion 22 is supported on rear end portions 6A of the pair of left and right down frames 6.

Further, the engine 20 is a water-cooled engine, and includes a cylinder block 22A which is connected to a front upper portion of the crankcase 21, a cylinder head 22B which is connected to an upper portion of the cylinder block 22A, and the cylinder head cover 22C which covers the cylinder head 22B from above thus constituting the cylinder portion 22.

To a back surface of the cylinder portion 22 of the engine 20, a throttle body 51 (see FIG. 2) and an air cleaner 52 which constitute an engine intake system are connected in order. To a front surface of the cylinder portion 22, an exhaust pipe 54 and a muffler 55 which constitute an engine exhaust system are connected in order.

To describe in more detail, the cylinder block 22A is provided with two cylinders 40, and a piston 41 is slidably arranged in each cylinder 40. The cylinder head 22B is provided with an intake valve 42, an exhaust valve 43, a cam shaft 44, and a rocker shaft 46 having a rocker arm 45. Respective intake ports 47 which extend toward the back surface of the cylinder head 22B from two cylinders 40 are merged into one intake port by an intake manifold portion 48, and the merged intake port is connected to the single throttle body 51.

The throttle body 51 is mounted on the intake manifold portion 48 by way of an insulator 50, a fuel injection valve not shown in the drawing is mounted on every cylinder on a one-to-one basis, and the air cleaner 52 is connected to an upper end (corresponding to an upstream end) of the throttle body 51. Further, as shown in FIG. 1, in a space defined between a rearwardly inclined back surface of the air cleaner 52 and a vertically extending front surface of the storage box 16, a canister 121, a fuse box 122, an anti-lock brake control part 123 and an electronic control unit 124 for performing an electric control of respective portions of the motorcycle 1 are sequentially arranged upwardly from an area in the vicinity of the engine 20.

Further, to outlets of respective exhaust ports 49 which extend toward a front surface of the cylinder head 22B from two cylinders 40, the exhaust pipe 54 (see FIG. 1) is connected for every cylinder. The exhaust pipes 54 extend downward and, thereafter, are bent and extend rearward, and are connected to the muffler 55 (see FIG. 1) arranged on a rear portion of the vehicle.

On a front portion of the crankcase 21, a crankshaft 60 which is connected to the piston 41 by way of a connecting rod is rotatably supported horizontally in the vehicle width direction. The rotation of the crankshaft 60 is transmitted to an output shaft 61 (see FIG. 1) arranged in a rear portion of the crankcase 21 by way of a speed change mechanism and a clutch mechanism not shown in the drawing. As shown in FIG. 1, a drive sprocket wheel 62 is mounted on the output shaft 61, and a power transmission chain 64 extends between and is wound around the drive sprocket wheel 62 and a driven sprocket wheel 63 which is integrally mounted on the rear wheel 14. A chain transmission mechanism which transmits power of the engine 20 to the rear wheel 14 is constituted of these parts.

In FIG. 1, an oil pan 23 is connected to a lower portion of the crankcase 21, and an oil filter 24 is mounted on a front surface of the crankcase 21. Engine oil in the oil pan 23 is sucked from a strainer not shown in the drawing by an oil pump not shown in the drawing which is driven by rotational power of the crankshaft 60, passes the oil filter 24 and, thereafter, is supplied to the respective parts of the engine 20. Further, in FIG. 1, a starter motor 26 is mounted on a front upper portion of the crankcase 21.

Further, a radiator 25 which cools engine cooling water is supported on the vehicle body frame 2 (down frames 6) and the cylinder head cover 22C in front of the cylinder portion 22 of the engine 20 and behind the front wheel. As shown in FIG. 3 to FIG. 7, the radiator 25 includes a core portion 70 and a pair of left and right tank portions 71, 72 which are arranged on both sides, that is, left and right sides of the core portion 70 respectively, and a radiator fan 73 which guides a flow of air to the radiator 25 is mounted on a rear portion side of the core portion 70 by way of a shroud 74 (mounting member). A water supply cap 75 is mounted on an upper portion of the right tank portion 71, and a supply-side hose 76 which is connected to a thermostat 81 is mounted on an upper rear portion of the tank portion 71. Further, a return-side hose 77 which is connected to the cylinder head 22B is mounted on an intermediate portion of the left tank portion 72.

Figure 6:
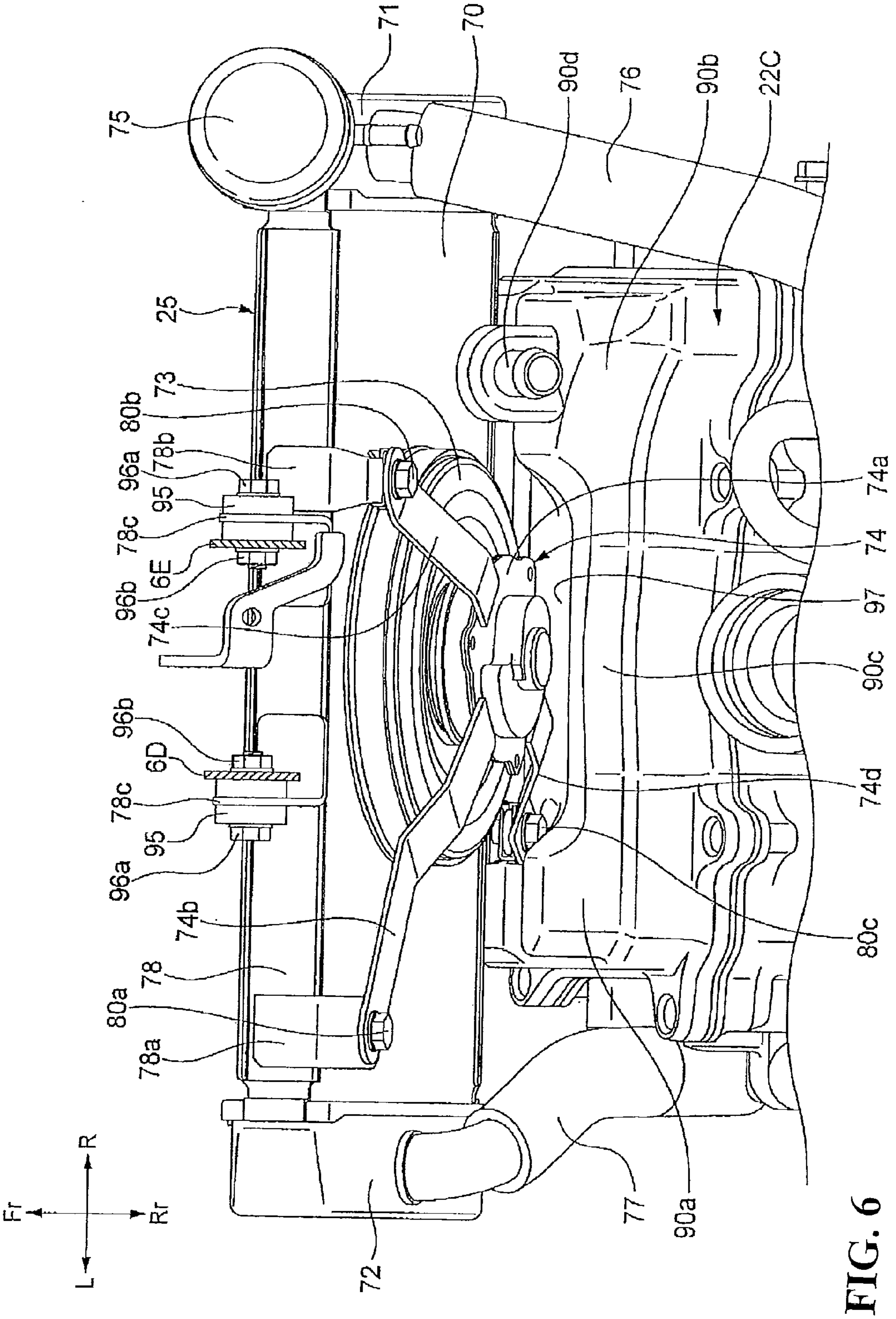
FIG. 6 is a top plan view showing a radiator and a cylinder head cover.
Figure 7:
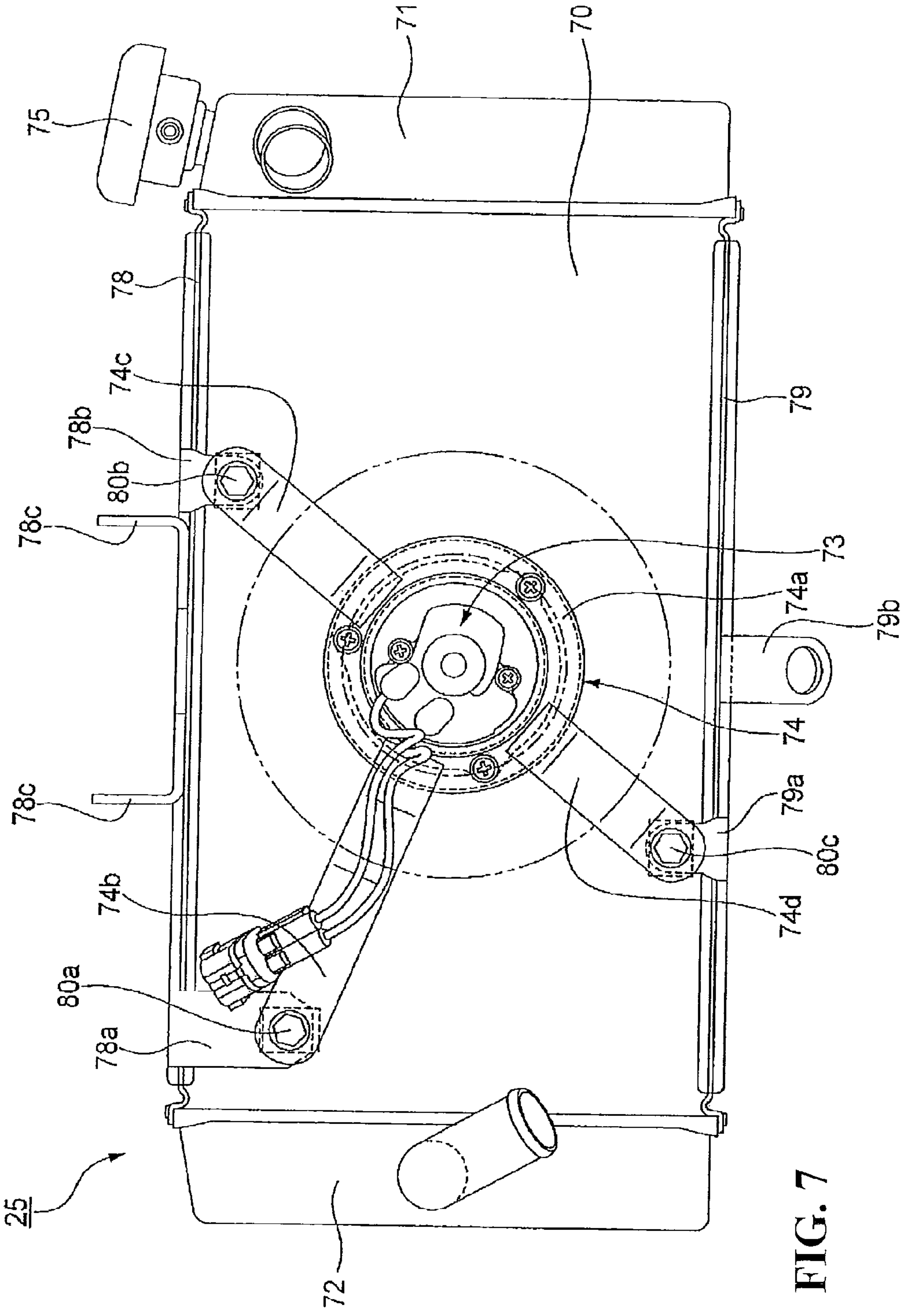
FIG. 7 is a back view of the radiator on which a radiator fan is mounted.

As shown in FIG. 6 and FIG. 7, the shroud 74 includes an annular portion 74*a* which covers a rear portion of the radiator fan 73, a stay 74*b* which extends obliquely in the leftward and upward direction from the annular portion 74*a*, a stay 74*c* which extends obliquely in the rightward and upward direction from the annular portion 74*a*, and a stay 74*d* which extends obliquely in the leftward and downward direction from the annular portion 74*a*. The radiator fan 73 is mounted on an upper portion and a lower portion of the radiator 25 such that the annular portion 74*a* of the shroud 74 is fitted on the radiator fan 73 from behind, brackets 78*a*, 78*b* which extend downward on left and right sides of an upper plate portion 78 of the core portion 70 and the stays 74*b*, 74*c* of the shroud 74 are fastened to each other by bolts 80*a*, 80*b*, and a bracket 79*a* which extends upward on a left side of a lower plate portion 79 of the core portion 70 and the stay 74*d* of the shroud 74 are fastened to each other by a bolt (mounting member) 80*c*.

Figure 4:
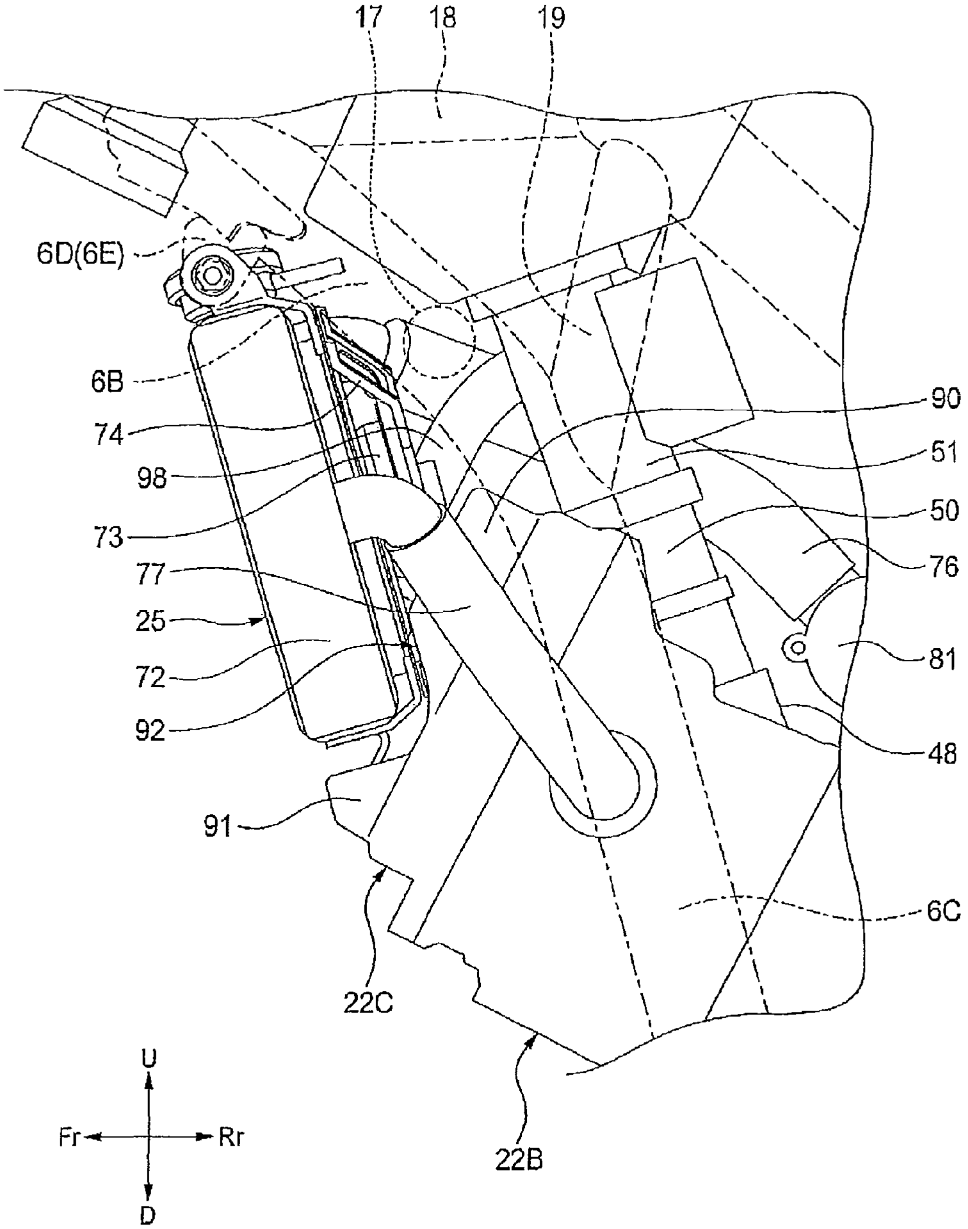
FIG. 4 is another left side view showing the front portion of the vehicle in an enlarged manner.
Figure 5:
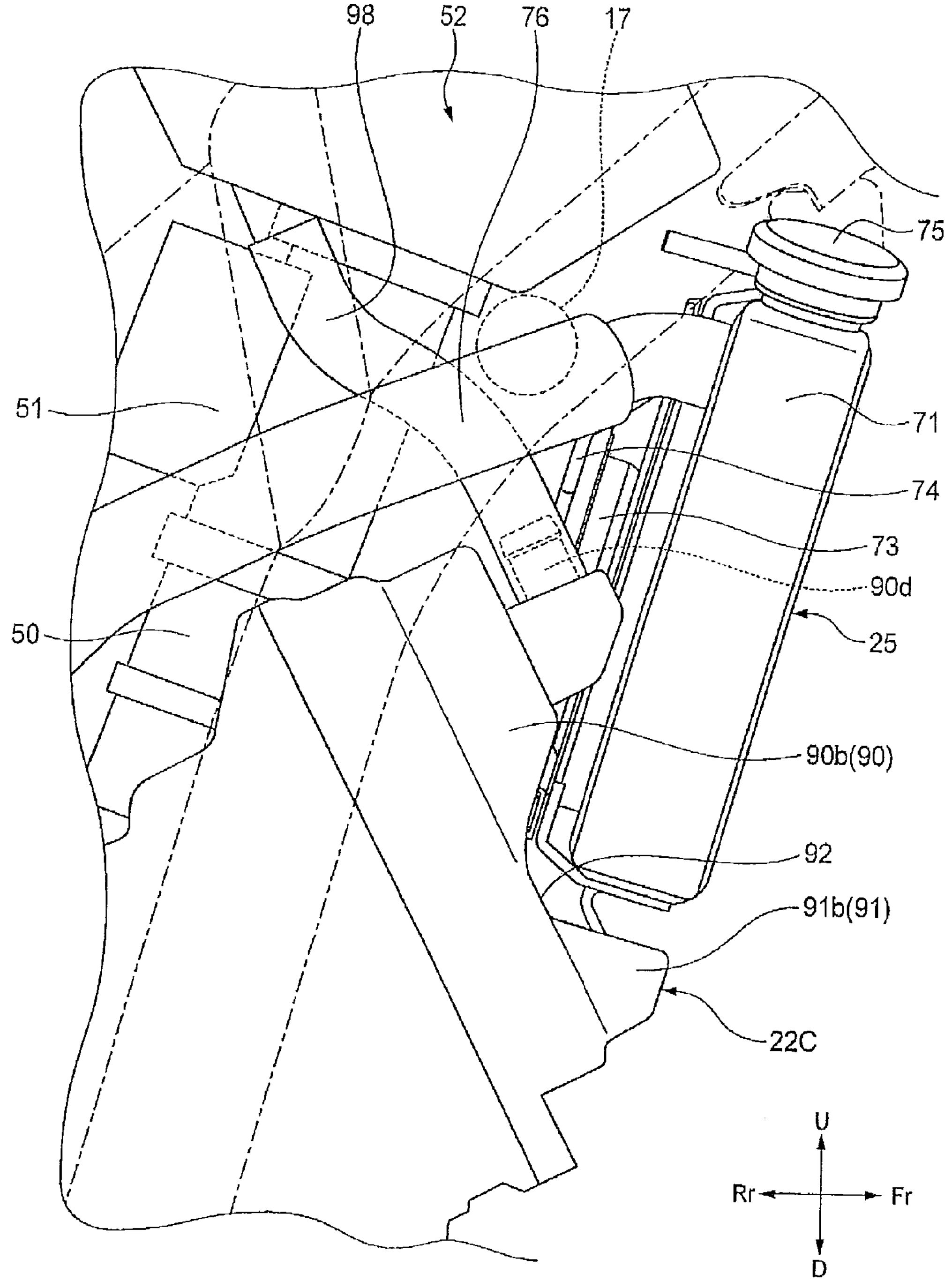
FIG. 5 is aright side view of the front portion of the vehicle in an enlarged manner.
Figure 8:
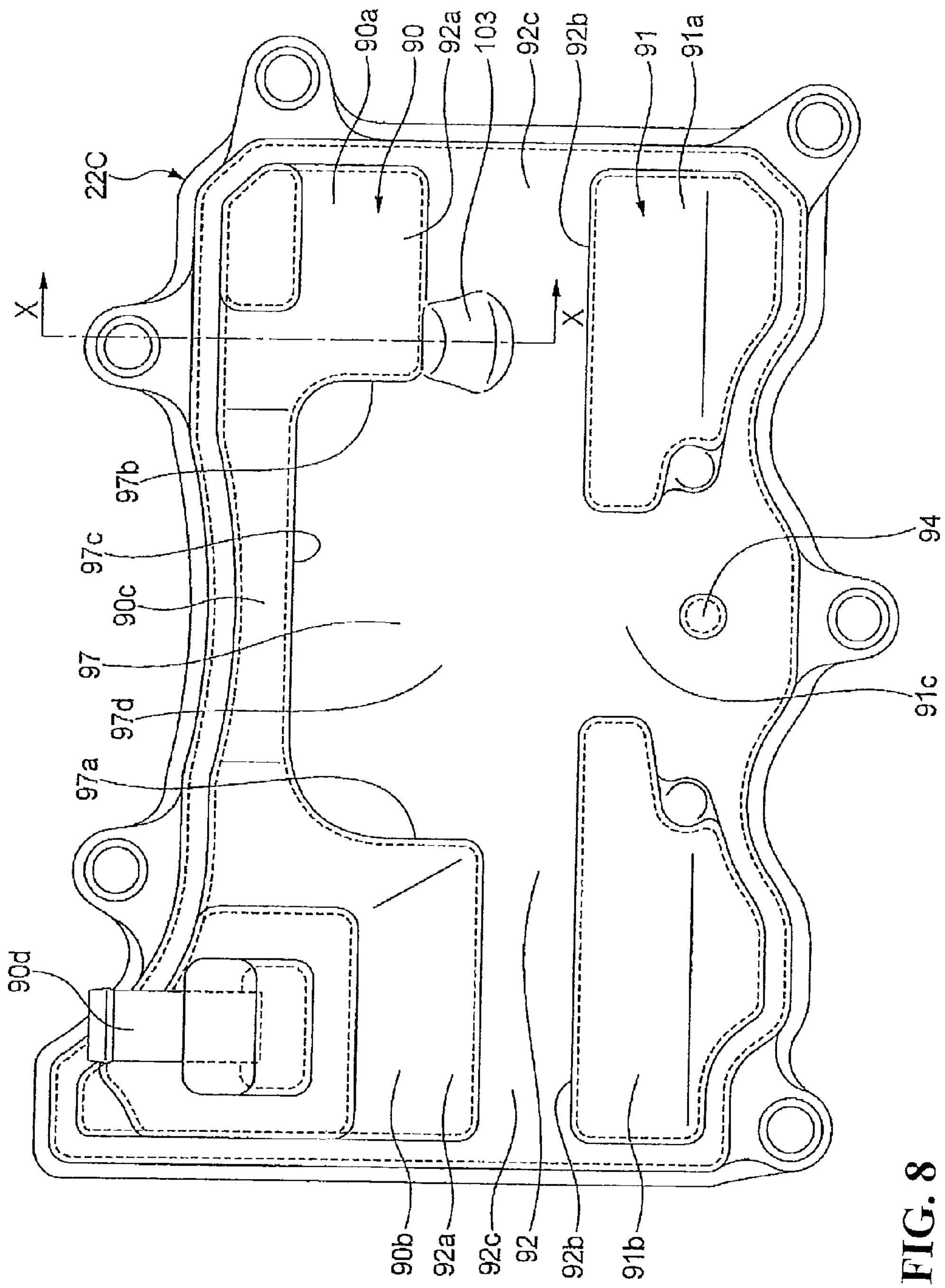
FIG. 8 is a top plan view of the cylinder head cover.

As shown in FIG. 4, FIG. 5 and FIG. 8, the cylinder head cover 22C includes an upper projecting portion 90 which is positioned on an upper side and a lower projecting portion 91 which is positioned on a lower side in a state where the engine 20 is mounted on the vehicle body frame 2 in a suspended manner. Further, between these upper and lower projecting portions 90, 91, a recessed portion 92 which is recessed toward a rear side of the vehicle is formed such that a portion of the radiator 25 enters the recessed portion 92. The recessed portion 92 is formed, on both end sides in the vehicle width direction, into an approximately V shape by wall surfaces 92*a*, 92*b* of the upper and lower projecting portions 90, 91 which face each other in an opposed manner and a planar surface 92*c* which is provided between the wall surfaces 92*a*, 92*b*. The planar surface 92*c* is continuously formed at an intermediate portion of the recessed portion 92 in the vehicle width direction.

The lower projecting portion 91 is divided into first and second lower projecting portions 91*a*, 91*b* in the vehicle width direction. Between the first and second lower projecting portions 91*a*, 91*b*, on a planar surface 91*c* which is continuously formed with the planer surface 92*c* of the recessed portion 92, a projection-shaped mounting portion 94 which mounts a lower bracket 79*b* extending downward from the center of the lower plate portion 79 of the core portion 70 of the radiator 25 thereon by way of a grommet 93 made of a resilient material is mounted.

Figure 3:
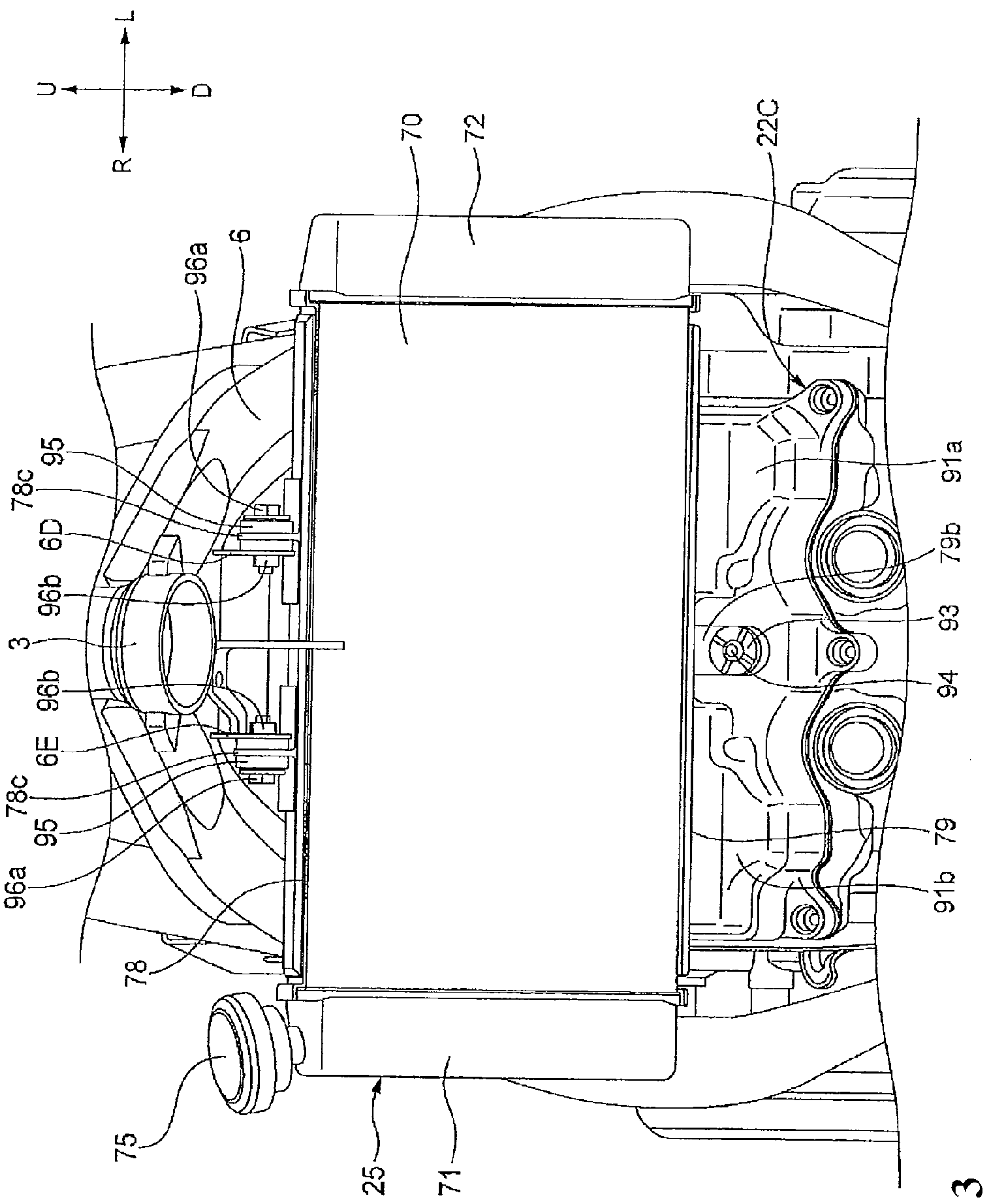
FIG. 3 is a front view showing the front portion of the vehicle behind a front wheel in a state where a front fork is removed.

Due to such a constitution, as shown in FIG. 3 and FIG. 6, the radiator 25 is mounted on the down frames 6 and the cylinder head cover 22C such that, in a state where the lower bracket 79*b* is fitted on the mounting portion 94 of the cylinder head cover 22C, a pair of upper brackets 78*c*, 78*c* which extend upward from the upper plate portion 78 of the core portion 70 in a spaced-apart manner in the lateral direction are fastened to a pair of stays 6D, 6E extending downward from front portions of the upper down frames 6B by bolts 96*a*, 96*a* and nuts 96*b*, 96*b* while mounting grommets 95, 95 made of an elastic material thereon.

The radiator 25 which is mounted in such a manner is positioned behind and below front ends of the upper down frames 6B and, at the same time, a side surface of the radiator 25 in the vehicle width direction is arranged substantially parallel to the lower down frames 6C. Further, the radiator 25 is mounted on the upper down frames 6B in the vicinity of an upper portion of the cross member which is positioned behind an upper portion of the radiator 25. Thus, the radiator 25 is mounted on the down frames 6 in a stable manner.

As shown in FIG. 8, the upper projecting portion 90 includes first and second upper projecting portions 90*a*, 90*b* which are provided at both end portion sides of the upper projecting portion 90 in the vehicle width direction and a third upper projecting portion 90*c* which connects the first and second upper projecting portions 90*a*, 90*b* on a rear side of the upper projecting portion 90 and is lower than the first and second upper projecting portions 90*a*, 90*b*. Due to such a constitution, another recessed portion 97 which a lower portion of the radiator fan 73 enters is formed by respective wall surfaces 97*a* to 97*c* of the first to third upper projecting portions 91*a* to 91*c* and a planar surface 97*d* which is continuous with the planar surface 92*c* of the recessed portion 92 such that another recessed portion 97 is continuous with the recessed portion 92 which a portion of the radiator 25 enters.

Accordingly, as shown in FIG. 5, when the radiator 25 is mounted on the down frames 6 and the cylinder head cover 22C in a state where the radiator 25 enters the recessed portion 92, the radiator fan 73 and the shroud 74 which are mounted on the radiator 25 partially overlap with the upper projecting portion 91 as viewed in a side view of the vehicle and, at the same time, are arranged in front of a rear end of the upper projecting portion 91.

Figure 9:
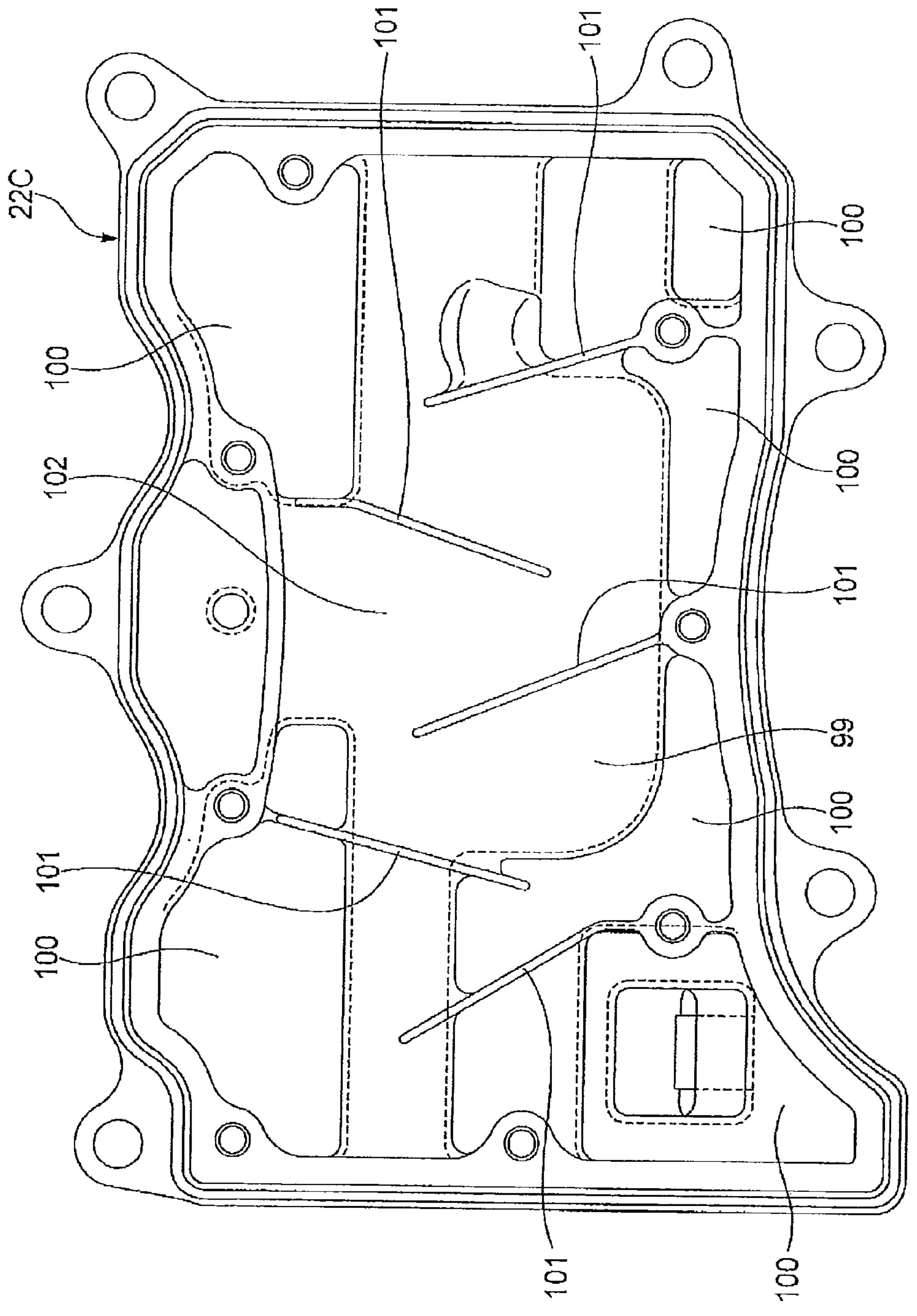
FIG. 9 is a back view of the cylinder head cover.
Figure 10:
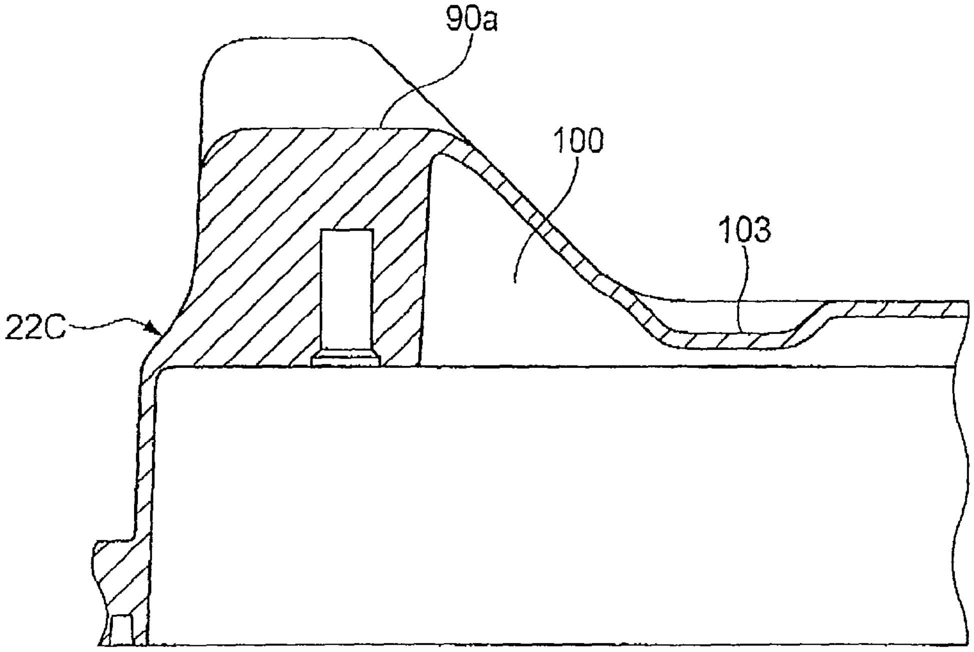
FIG. 10 is a cross-sectional view of the cylinder head cover taken along a line X-X in FIG. 8.

In the second upper projecting portion 90*b* of the cylinder head cover 22C, a connecting port (connecting portion) 90*d* to which other end portion of a breather hose 98 which has one end portion thereof connected to the air cleaner 52 arranged behind and above the radiator 25 is connected is formed. The breather hose 98 connects the air cleaner 52 and a breather chamber 99 which is formed in the inside of the cylinder head cover 22C to each other, and introduces a breather gas discharged from the breather chamber 99 to the air cleaner 52. The breather chamber 99 is, as shown in FIG. 9, formed so as to define a passage 102 around the recessed portion 92 in the inside of the cylinder head cover 22C by a recess 92 which is formed in the inside by the upper and lower projecting portions 90, 91 and a plurality of wall portions 101. The breather chamber 99 separates accompanying oil by making use of a change of flow direction of the breather gas.

Further, the radiator fan 73 is mounted on a lower portion of the radiator 25 on a side opposite to the second upper projecting portion 90*b* which constitutes the connection port 90*d* of the cylinder head cover 22C to which the breather hose 98 is connected in the vehicle width direction. Here, an indentation portion 103 which becomes a run-out recess for the stay 74*c* of the shroud 74 and the bolt 80*c* for mounting the radiator fan 73 on the lower portion of the radiator 25 is formed on the planar surface 92*c* of the recessed portion 92 of the cylinder head cover 22C (see FIG. 8).

As has been explained above, according to the cylinder head cover structure of motorcycle of this embodiment, the recessed portion 92 which is recessed toward the rear side of the vehicle is formed in the cylinder head cover 22C so as to allow the lower portion of the radiator to enter the recessed portion 92. Accordingly, the lower portion of the radiator 25 enters the recessed portion 92. Thus, it is possible to prevent the radiator 25 from coming into contact with the front wheel 10 and the cylinder head cover 22C whereby the radiator 25 can be arranged closer to the engine 20 in a compact manner while avoiding the restriction imposed on the layout of the engine 20 thus realizing the shortening of a longitudinal length of the vehicle.

Further, the inside of the cylinder head cover 22C forms the breather chamber 99 around the recessed portion 92. Thus, even when the cylinder head cover 22C becomes large, it is possible to efficiently form the breather chamber 99 without elongating the longitudinal length of the vehicle.

Still further, the cylinder head cover 22C includes the upper projecting portion 90 which is positioned at the upper side, and the lower projecting portion 91 which is positioned at the lower side in a state where the engine 20 is mounted on the vehicle body frame 2 in a suspended manner, and the breather hose 98 is connected to the upper projecting portion side of the cylinder head cover 22C. Accordingly, compared to a case where the breather hose 98 is connected to the lower projecting portion side of the cylinder head cover 22C, it is possible to easily prevent the breather hose 98 from coming into contact with the radiator 25. Thus, the breather hose 98 can be shortened.

In addition, the mounting portion 94 on which the radiator 25 is mounted is provided between the first and second lower projecting portions 91*a*, 91*b* which are formed by dividing the lower projecting portion 91 in the vehicle width direction. Accordingly, the radiator 25 can be stably mounted without making the cylinder head cover 22C large, and it is possible to ensure the breather chamber 99 having a fixed capacity in the inside of the first and second lower projecting portions 91*a*, 91*b*.

Further, another recessed portion 97 which the lower portion of the radiator fan 73 enters is formed in the cylinder head cover 22C continuously with the recessed portion 92 which the lower portion of the radiator 25 enters. Accordingly, the lower portion of the radiator fan 73 enters another recessed portion 97. Thus, the radiator fan 73 can be arranged in a compact manner without elongating the longitudinal length of the vehicle.

Further, the radiator fan 73 is mounted on the lower portion of the radiator 25 on a side opposite to the connection port 90*d* of the cylinder head cover 22C to which the breather hose 98 is connected in the vehicle width direction. Accordingly, the bracket 79*a* of the radiator 25, the stay 74*d* of the shroud 74 and the bolt 80*c* which constitute the portion on which the radiator fan 73 and the lower portion of the radiator 25 are mounted and the connection port 90*d* to which the breather hose 98 is connected can be arranged in a limited space without elongating the cylinder head cover 22C in the longitudinal direction of the vehicle.

Further, at least one of the radiator fan 73 and the stay 74*d* of the shroud 74 which mounts the radiator fan 73 on the lower portion of the radiator 25 partially overlaps with the upper projecting portion 90 as viewed in a side view of the vehicle, and is arranged in front of the rear end of the upper projecting portion 90. Accordingly, it is possible to arrange the radiator 25 and the radiator fan 73 closer to the cylinder head cover 22C in the longitudinal direction of the vehicle. Thus, a mass of the frontal parts of the engine 20 can be concentrated and, at the same time, the longitudinal length of the vehicle can be shortened.

Further, the indentation portion 103 which constitutes the run-out recess for the bolt 80*c* for mounting the radiator fan 73 on the lower portion of the radiator 25 is formed on the recessed portion of the cylinder head cover 22C. Accordingly, the mounting of the radiator fan 73 is not restricted by the bolt 80*c* so that it is possible to mount the radiator 25 and the radiator fan 73 such that the radiator 25 and the radiator fan 73 are arranged much closer to the cylinder head cover 22C. Here, the indentation portion 103 is not limited to the run-out recess for the bolt 80*c*, and it is sufficient that the indentation portion 103 constitutes the run-out recess for the mounting member. Further, when a fastening member except for the bolt is used, it is sufficient that the indentation portion 103 constitutes the run-out recess for the fastening member.

Further, the radiator 25 is positioned behind and below the front ends of the upper down frames 6B, and the side surface of the radiator 25 in the vehicle width direction is arranged approximately parallel to the lower down frames 6C. Accordingly, it is possible to arrange the radiator 25 by effectively making use of the space in the vicinity of the down frames 6 while preventing the radiator 25 from coming into contact with the down frames 6.

In addition, the radiator 25 is mounted on the down frames 6 in the vicinity of an area above the cross member 17 which connects the left and right down frames 6. Thus, it is possible to mount the radiator 25 in the vicinity of the highly rigid cross member 17 of the down frames 6 thus realizing the more stable mounting of the radiator 25.

The present invention is not limited to the above-mentioned embodiment, and modifications, improvements and the like can be suitably made with respect the present invention. For example, in the above-mentioned embodiment, the explanation has been made with respect to the case where the present invention is applied to the motorcycle shown in FIG. 1. However, the present invention is not limited to such a motorcycle and the present invention may be applied to saddle-ride-type vehicles such as other motorcycles. The saddle-ride-type vehicle includes all vehicles where a rider rides a vehicle body in a straddling manner, and includes not only a motorcycle (also including a prime-mover-assisted bicycle) but also a three-wheeled vehicle and a four-wheeled vehicle which are classified into an ATV (All Terrain Vehicle). Further, the saddle-ride-type vehicle also includes a scooter-type vehicle having a low-floor foot placing portion.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A cylinder head cover structure of a vehicle comprising:

a vehicle body frame;

an engine which is mounted on the vehicle body frame in a suspended manner and includes a cylinder head cover; and a radiator which is arranged in front of the engine and behind a front wheel, wherein the cylinder head cover includes:

an upper projecting portion on an upper side thereof, a lower projecting portion on a lower side thereof, a recessed portion formed between the upper and lower projecting portions is recessed toward a rear side of the vehicle, wherein a portion of the radiator enters the recessed portion, a breather chamber formed inside the cylinder head cover in a position adjoining each of the upper and lower projecting portions, a radiator fan for guiding a flow of air to the radiator is mounted on a rear portion of the radiator, and another recessed portion which a portion of the radiator fan enters is formed in the cylinder head cover continuously with the recessed portion which the portion of the radiator enters.

2. The cylinder head cover structure of a vehicle according to claim 1, wherein the cylinder head cover structure further comprises:

a breather hose which connects the breather chamber which is formed inside the cylinder head cover, and an air cleaner which is arranged behind and above the radiator, and the breather hose is connected to an upper projecting portion side of the cylinder head cover.

3. The cylinder head cover structure of a vehicle according to claim 2, wherein the lower projecting portion is divided into first and second lower projecting portions in a vehicle width direction, and a mounting portion on which the radiator is mounted is provided between the first and second lower projecting portions.

4. The cylinder head cover structure of a vehicle according to claim 1, wherein the cylinder head cover structure further comprises a breather hose which connects the breather chamber which is formed inside the cylinder head cover and an air cleaner which is arranged behind and above the radiator, and the radiator fan is mounted on a lower portion of the radiator on a side opposite to a connecting portion of the cylinder head cover to which the breather hose is connected in a vehicle width direction.

5. The cylinder head cover structure of a vehicle according to claim 4, wherein at least one of the radiator fan and a mounting member which mounts the radiator fan on the lower portion of the radiator partially overlaps with the upper projecting portion as viewed in a side view of the vehicle, and is arranged in front of a rear end of the upper projecting portion.

6. The cylinder head cover structure of a vehicle according to claim 1, wherein an indentation portion which constitutes a run-out recess for a mounting member for mounting the radiator fan on a lower portion of the radiator is formed on the recessed portion of the cylinder head cover.

7. The cylinder head cover structure of a vehicle according to claim 1, wherein the vehicle body frame includes a head pipe, and a main frame and a down frame which respectively obliquely extend toward the rear side of the vehicle in a vertically spaced-apart manner from the head pipe, and the down frame is gently bent in the vicinity of the cylinder head cover as viewed in a side view of the vehicle so that the down frame is constituted of an upper down frame which is arranged above an area in the vicinity of the cylinder head cover and a lower down frame which is arranged below the area in the vicinity of the cylinder head cover, and the radiator is positioned behind and below a front end of the upper down frame, and a side surface of the radiator in a vehicle width direction is arranged approximately parallel to the lower down frame.

8. The cylinder head cover structure of a vehicle according to claim 7, wherein a cross member which connects left and right down frames is provided above and behind the radiator, and the radiator is mounted on the down frames in the vicinity of an area above the cross member.

9. The cylinder head cover structure of a vehicle according to claim 1, wherein a cross member which connects left and right down frames is provided above and behind the radiator, and the radiator is mounted on the down frames in the vicinity of an area above the cross member.

10. A cylinder head cover structure comprising an engine;

a cylinder head cover operatively mounted on the engine; and a radiator which is arranged in front of the engine, wherein the cylinder head cover includes, an upper projecting portion on an upper side thereof, a lower projecting portion on a lower side thereof, a recessed portion formed between the upper and lower projecting portions is recessed toward a rear side of the engine, wherein a portion of the radiator enters the recessed portion, a breather chamber formed inside the cylinder head cover in a position adjoining each of the upper and lower projecting portions, a radiator fan for guiding a flow of air to the radiator is mounted on a rear portion of the radiator, and another recessed portion which a portion of the radiator fan enters is formed in the cylinder head cover continuously with the recessed portion which the portion of the radiator enters.

11. The cylinder head cover structure according to claim 10, wherein the cylinder head cover structure further comprises:

a breather hose which connects the breather chamber formed inside the cylinder head cover, and an air cleaner which is arranged behind and above the radiator, and the breather hose is connected to an upper projecting portion side of the cylinder head cover.

12. The cylinder head cover structure according to claim 11, wherein the lower projecting portion is divided into first and second lower projecting portions in an engine width direction, and a mounting portion on which the radiator is mounted is provided between the first and second lower projecting portions.

13. The cylinder head cover structure according to claim 10, wherein the cylinder head cover structure further comprises a breather hose which connects the breather chamber which is formed inside the cylinder head cover and an air cleaner which is arranged behind and above the radiator, and the radiator fan is mounted on a lower portion of the radiator on a side opposite to a connecting portion of the cylinder head cover to which the breather hose is connected in an engine width direction.

* * * * *